June 18, 1963  R. J. BERNIER  3,094,354
CAR SEAT ASSEMBLY
Filed April 16, 1962  2 Sheets-Sheet 1
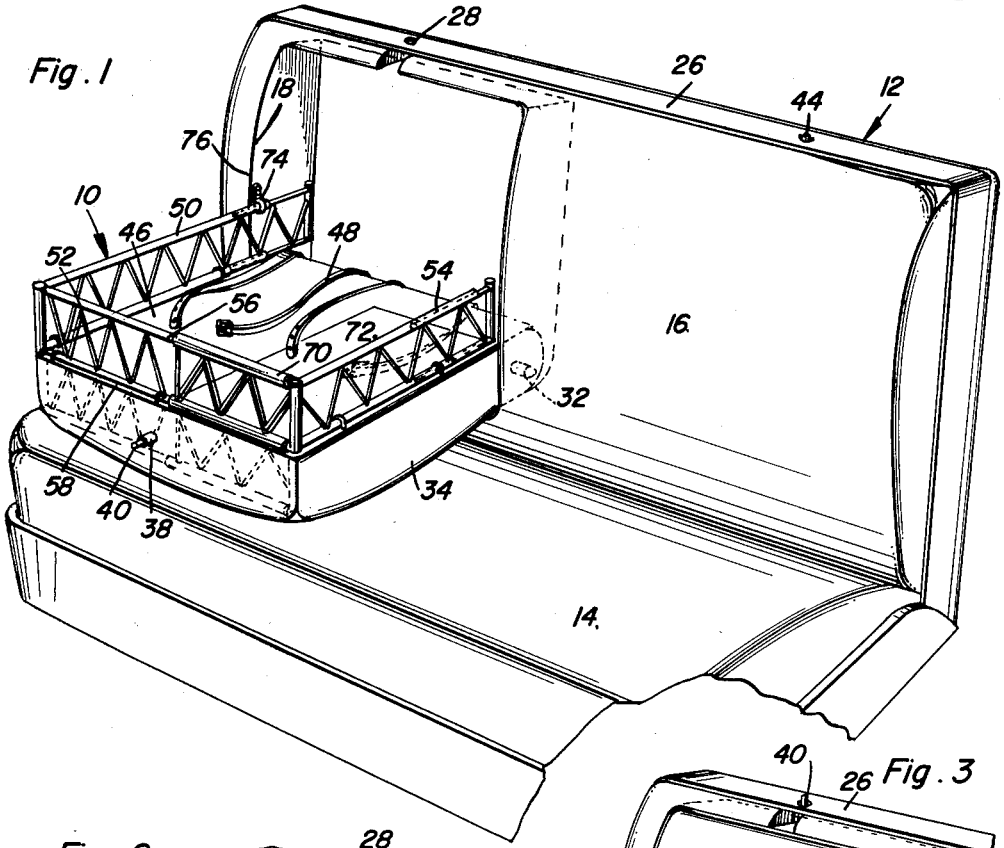
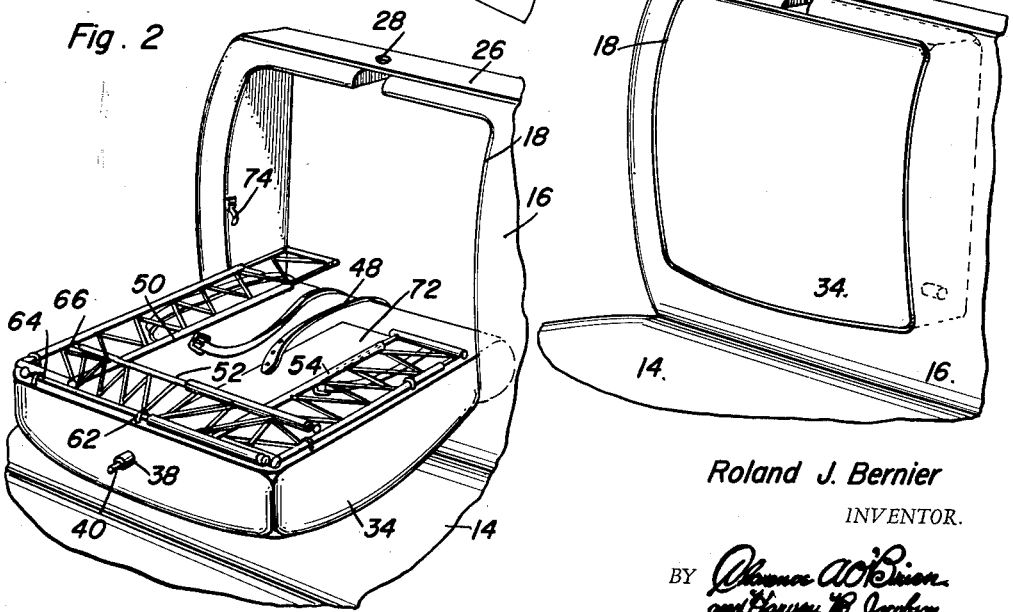
Roland J. Bernier
INVENTOR.

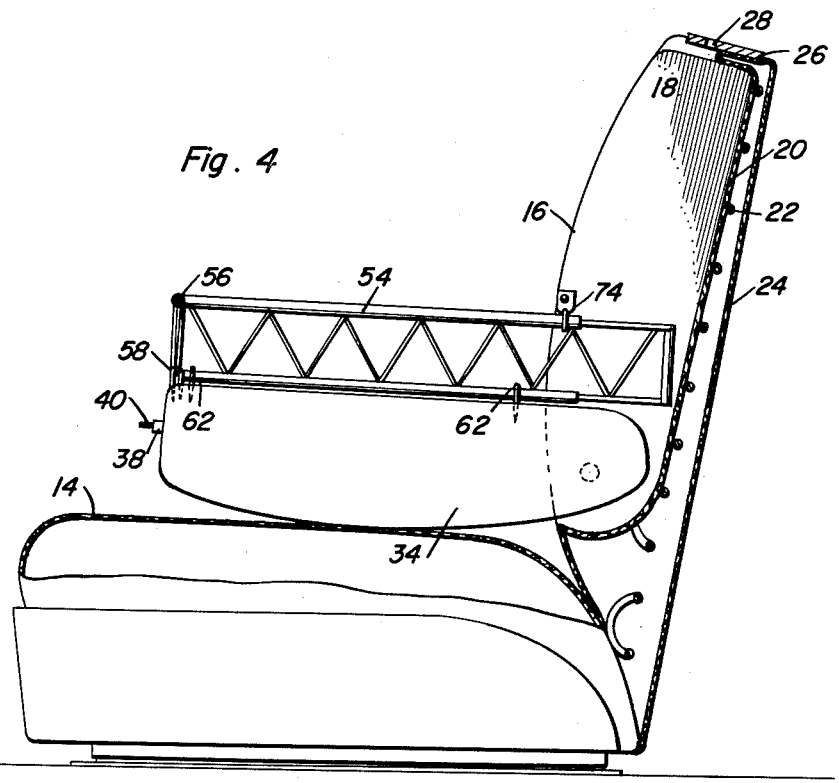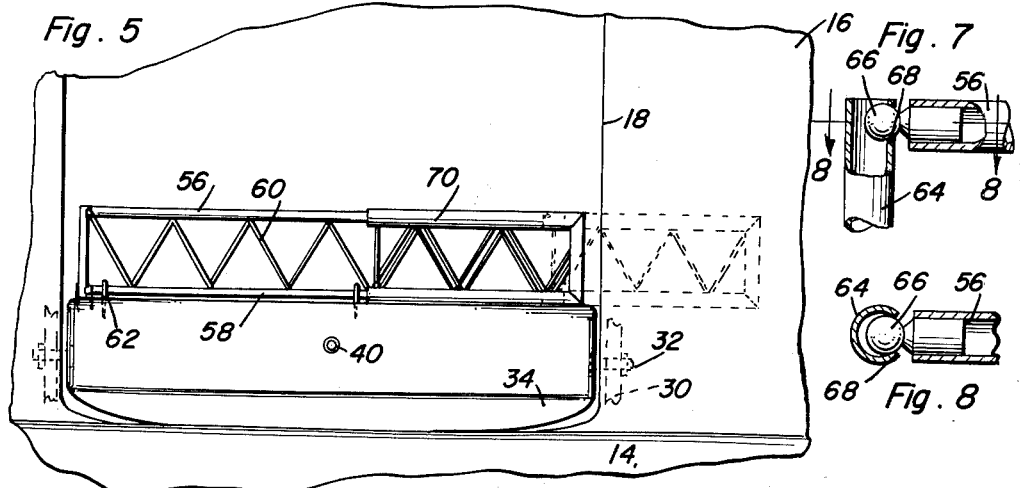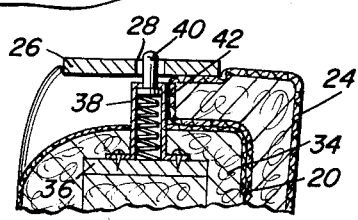

United States Patent Office

3,094,354
Patented June 18, 1963

**3,094,354
CAR SEAT ASSEMBLY**
Roland J. Bernier, Newton, N.H.
(Rte. 2, Box 223B, Plaistow, N.H.)
Filed Apr. 16, 1962, Ser. No. 187,893
5 Claims. (Cl. 297—112)

The present invention generally relates to an auxiliary car seat assembly and more particularly to a seat for small children that is incorporated into and recessed into the seat back of a conventional automobile seat and may be disposed in the back of the front seat in the area normally occupied by a passenger or in the back of the rear seat.

The primary object of the present invention is to provide a car seat assembly which is pivotally disposed and releasably retained within the confines of a recess formed in the seat back whereby the car seat actually then forms a part of the seat back thus enabling the seat back to be used in the normal manner with the car seat assembly being pivoted to an operative position by releasing a latch mechanism. The structure can also be used as a carry-all for liquids, groceries, etc. that may be apt to stain, mark or tear the upholstery.

Another object of the present invention is to provide a car seat assembly having a bottom which is laterally extensible for enabling the over-all support area of the seat to be enlarged.

Another important object of the present invention is to provide a car seat assembly having pivoted side walls or fences attached thereto for retaining a child or two children in place thereon together with retaining straps for retaining a child or children on the seat.

Still another important feature of this invention resides in its simplicity of construction, ease of operation, effectiveness in use and its generally inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the vehicle seat with the car seat assembly thereof incorporated;

FIGURE 2 is a perspective view similar to FIGURE 1 but with the side fences thereof in collapsed position;

FIGURE 3 is a perspective view of the car seat assembly collapsed into the seat back of the vehicle seat;

FIGURE 4 is a vertical sectional view of the seat back illustrating the relationship of components of the auxiliary seat to the seat back;

FIGURE 5 is a front elevational view of the car seat assembly illustrating the manner in which the retaining fence may be laterally extended;

FIGURE 6 is a detailed sectional view illustrating the construction of the latch mechanism for the car seat assembly;

FIGURE 7 is a detail sectional view illustrating the connection between the fence or wall components; and FIGURE 8 is a detailed sectional view taken substantially upon a plane passing along section line 8—8 of FIGURE 7 illustrating further details of the connection illustrated in FIGURE 7.

Referring now specifically to the drawings, the numeral 10 generally designates the car seat assembly of the present invention which is incorporated into a vehicle seat generally designated by the numeral 12. The vehicle seat 12 includes the usual seat cushion 14 and a seat back cushion 16 which may be constructed in accordance with conventional practices except that the seat back 16 has the car seat assembly 10 of the present invention incorporated therein. For receiving the car seat assembly 10, the seat back 16 is provided with a recess 18 communicating with the front surface thereof with the recess being defined by a fabric wall 20 covering a spring or frame assembly 22 with the entire seat back 16 having a rear fabric cover 24. The top edge of the seat back is provided with a rigid metal bar or strap 26 having an aperture 28 therein generally in alignment with the center of the recess 18. Supporting brackets 30 are provided on each side of the recess 18 for pivotally supporting laterally projecting pivot pins 32 carried by the inner end of the seat assembly 10 thus enabling the seat assembly to swing outwardly to substantially a horizontal position with the car seat assembly 10 resting on the surface of the seat or cushion 14 wherein the car seat assembly 10 is disposed substantially in horizontal position.

The car seat assembly 10 includes a generally rectangular cushion 34 which conforms to the curvature and surface of the seat back 16 so that when the car seat assembly 10 is in closed position as illustrated in FIGURE 3, there will be substantially no interruptions to the surface of the seat back 16. A frame member 36 is provided interiorly of the cushion 34 and the projecting pins or axles 32 are rigid with the frame 36. At the upper end of the frame 36, there is provided a sleeve 38 having a projecting round-nosed pin 40 movable therein with a spring 42 being disposed between the movable member 40 and the bottom of the sleeve 38 thus urging the movable pin into the aperture 28 in the bar or plate 26 thereby releasably locking the car seat assembly of the present invention in collapsed or stored position. For purposes of symmetry, a similar pin or simulated pin 44 is provided in the portion of the plate or bar 26 disposed at the opposite side of the seat back 16. By depressing the pin 40, the cushion 34 may be released from or retained in the recess 18.

When the cushion 34 is in horizontal position, it is provided with a seat-forming panel 46 and retaining belts 48 are provided which are attached to the inner edge thereof and provided with suitable connecting means at the outer ends thereof for retaining a child or two children in position on the seat panel 46. Extending peripherally of the seat panel 46 is a plurality of fence members including a side fence member 50, a front fence member 52 and a second side fence member 54. In each instance, the fence member forms a retaining wall or fence for the panel 46. Each of the fences includes a top rail 56 and a bottom rail 58 interconnected by a plurality of brace members 60. The bottom rail 58 of each of the fences 50 and 52 is pivotally attached to the panel 46 of the cushion 34 by staple-type fasteners 62 thus pivotally supporting said fences in position so that they may fold down into a flat condition as illustrated in FIGURE 2 and so that the front fence 52 also may fold down into overlying relation to the front surface of the cushion 34 as shown in dotted lines in FIGURE 1 of the drawing. The corners of the fences have detachably interengaging upstanding tubular connecting members 64 which engage interlockingly ball members 66 on the ends of the upper and lower tubes 56 and 58 respectively as illustrated in FIGURES 7 and 8. The tubular members 64 have sockets 68 detachably and frictionally engaging the ball projections 66 thereby securing the fences detachably to each other at the ends or corners of the device.

The forward fence 52 is provided with a telescopic section 70 at the inner end thereof which is extensible along with a panel 72 attached to the fence 54 so that it will move laterally when the fence 54 is moved and the telescopic section 70 of the front fence 56 is extended to the position illustrated in dotted lines in FIGURE 5 thereby increasing the effective area of the seat panel. In order to enable this to be accomplished, the fence 54 has a rear end terminating slightly forwardly of the seat back 16 thus enabling the rigid panel 72 to be moved outwardly in relation to the panel 46 for use in the extended position as illustrated in FIGURE 5.

With the front fence or wall 52 folded downwardly about an axis defined by the staples or other fasteners 62 to the dotted line position illustrated in FIGURE 1, the device may then be used as a car seat with the legs of a child hanging over the front edge thereof. Also, the side fence or wall 50 extends rearwardly into the recess 18 and is engaged by a pivotal hook 74 mounted on the side wall of the recess 18 by a pivot fastener 76 thereby enabling the hook to secure the wall or fence 50 and rigidly retain it in upright position when the front wall 52 is in the downwardly folded position illustrated in dotted lines in FIGURE 1 thereby rigidifying the side wall or fence 50. This construction also may be used on the fence 54 with the inner ends of both fences 50 and 54 being telescopic to enable the fences to be folded downwardly and the entire assembly folded back into the cushion recess 18.

With the fences in an upright position, the device may be used as a crib for a child to sleep in and it may be extended laterally by inward telescopic movement of the extending end of the fence 54 so that the fence 54 along with the rigid panel 72 may be moved laterally together with the sleeve 70 on the extending rods of the fence 52. With the seat assembly in the position illustrated in FIGURE 1 and the side thereof extended as illustrated in dotted line in FIGURE 5, the device serves quite effectively as a crib. The top edges of the walls or fences are made of tubing which provide sufficient rigidity and strength to withstand the forces normally encountered thereby. The spring detent or pin having the ball shaped end may be chrome plated for attractiveness in appearance and the stationary ball or pin 44 on the other half of the seat may also be chrome plated for attractiveness of appearance. Also, the metallic band or strap 26 may be chrome plated for attractiveness and to balance the appearance of the seat structure. When the device is to be used as a car seat for one or two children, the front wall 52 is pivoted downwardly and the side walls 50 and 54 are anchored by the drop hooks 74 thus rigidifying the side walls.

When the small children are fastened in the car seat by safety belts, it will protect them from sudden stops and yet be at a height convenient for the children to see out of the windows. This would relieve the operator of the vehicle from the responsibility of caring for the children and he would be able to concentrate on the operation of the automobile and give his undivided attention to such operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle seat including a bottom and a back, said back having a recess therein, and an auxiliary seat including a vertically swingable cushioned panel pivotally mounted on the back and engaged in the recess when in an inoperative position and resting on the bottom in an operative position, a foldable front fence hingedly mounted for vertical swinging movement on the free end portion of the panel and including a slidable extension on one end, a plate slidable on the panel and providing a lateral extension therefor, and means connecting the fence extension to the plate for operation in unison therewith.

2. The combination of claim 1, together with a foldable side fence hingedly mounted for vertical swinging movement on the panel, said means including, a foldable side fence hingedly mounted on the plate, and means detachably connecting the second-named side fence to the front fence extension when said front and said second-named side fences are in an operative position.

3. The combination of claim 2, the last-named means including a tubular member on one end of the second named side fence and having sockets therein, and balls on the adjacent end of the front fence extension removably anchored in the sockets.

4. The combination of claim 3, and extensions on the side fences engaged in the recess when said side fences are in an operative position.

5. The combination of claim 4, and means on opposed walls of the recess for releasably securing the side fences in said operative position when the front panel is disconnected therefrom.

References Cited in the file of this patent
UNITED STATES PATENTS

| | | |
|---|---|---|
| 484,975 | Perry | Oct. 25, 1892 |
| 1,402,607 | Hickman | Jan. 3, 1922 |
| 1,563,428 | Melton | Dec. 1, 1925 |
| 2,555,659 | Rose | June 5, 1951 |
| 2,583,187 | Newbern | Jan. 22, 1952 |
| 2,817,856 | De Witt | Dec. 31, 1957 |
| 2,901,755 | Wood | Sept. 1, 1959 |
| 2,966,201 | Strahler | Dec. 27, 1960 |

FOREIGN PATENTS

| | | |
|---|---|---|
| 941,571 | Germany | Apr. 12, 1956 |